United States Patent Office 3,443,596
Patented May 13, 1969

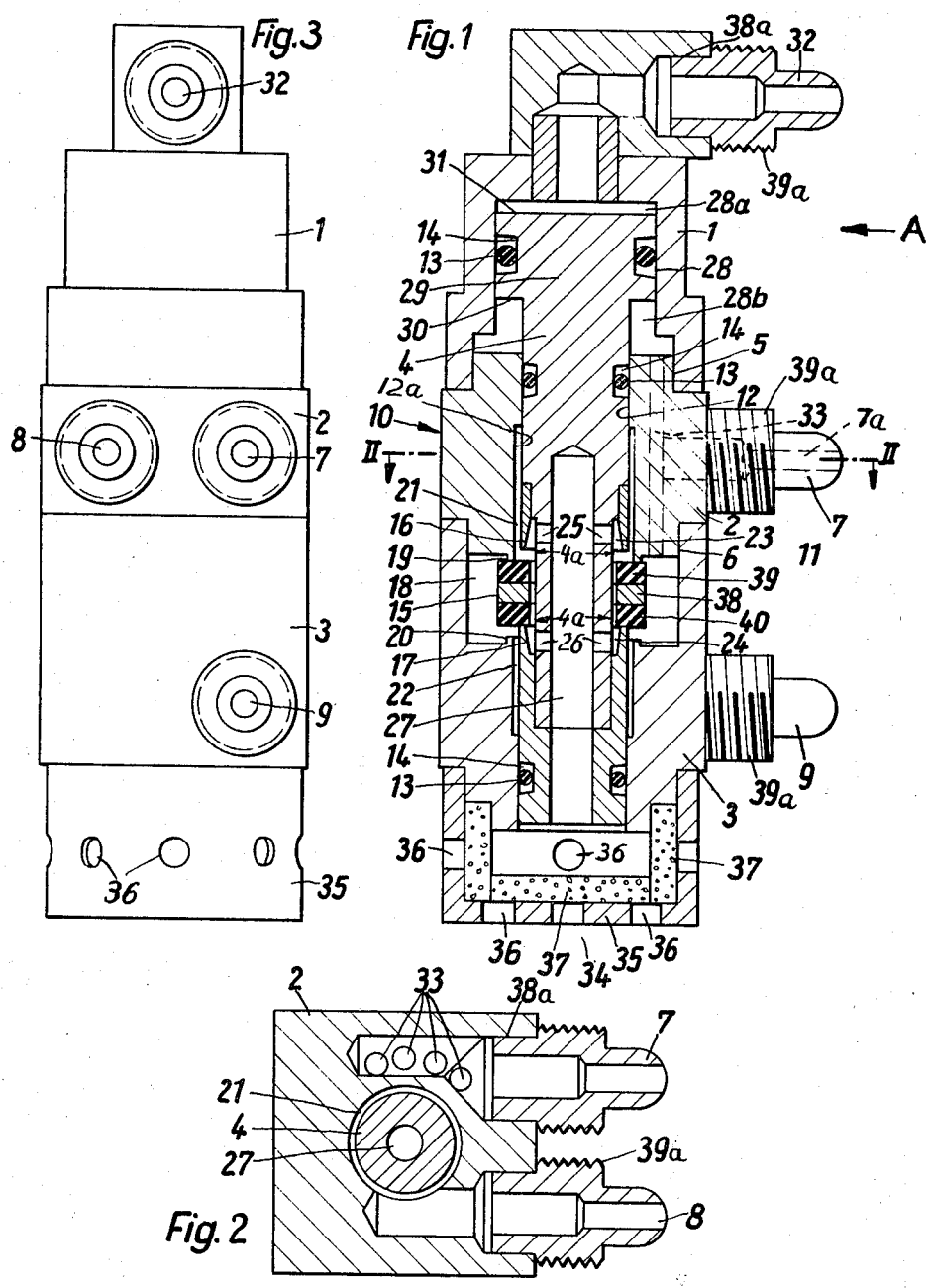

3,443,596
SEQUENTIALLY CLOSING AND OPENING ALTERNATELY SEATING FLOW CONTROL VALVE
Anatol Klenk, Bogenstr. 17, Ludwigsburg, Germany
Filed Feb. 9, 1966, Ser. No. 526,264
Claims priority, application Germany, Feb. 12, 1965,
K 55,260
Int. Cl. F16k 21/00
U.S. Cl. 137—627.5                                11 Claims

ABSTRACT OF THE DISCLOSURE

A valve having a body of axial sections of synthetic material cemented together with a piston driven spindle reciprocable in the valve bore. A valve disc with a lost motion connection to the spindle is disposed between spaced valve seats and controls the connection of a pressure line with two service lines and the connection of the two service lines with an exhaust passage which preferably extends through the spindle.

---

The present invention relates to a valve with a valve spindle which is displaceable in the bore of a valve housing and which is sealed in said bore while the housing is provided with inlet and outlet connections for the flowing medium.

Heretofore known valves of the above mentioned general type comprise a housing of metal, as for instance a precision cast housing. Such precision cast housings are for reasons connected with the casting technology limited to certain shapes as a result of which these valves cannot always be shaped in conformity with the specific purpose of employment. As a result thereof, the possibilty of easily checking the valve and of arranging the same in a most practical manner in a control device or the like is available only within certain limits.

A further disadvantage of heretofore known valves of the type involved is seen in the fact that the valves made of metal are comparatively heavy and can be employed only within certain limits. In the construction of airplanes, the relatively heavy weight of these valves is frequently the reason why the control of various units has to be effected electrically.

It may also be mentioned that heretofore known valves of the type involved do not allow the observation of the flow of the flowing medium so that in case of disorders the reason for such disorders cannot easily be found.

Another disadvantage of the heretofore known valves of the type involved is seen in the arrangement of the seals or gaskets which are employed usually in the form of O-rings arranged in grooves. The width of the grooves in this connection is so selected that the O-rings just fit in the respective grooves. When the seal is arranged between two parts movable relative to each other, such movement will due to the friction with the seal encounter a considerable resistance which in turn requires increased forces for controlling the valve. Due to their fixed position, the said seals are more or less ground at their circumference so that their sealing ability is considerably affected in a relatively short time.

For the sake of completness it may be mentioned that in connection with the control of heretofore known valves of the type involved it is known to employ magnetic controls as well as fluid pressure controls. Magnetic controls require a relatively large number of elements and as a rule also require larger dimensions than the valve itself so that such magnetic controls are practical only under certain conditions. The pressure controlled heretofore known valves have the drawback that the alternate actuation of the valve control piston requires an additional valve.

With heretofore known valves the venting conduits are usually designed as bypass passage in the housing. Such bypass passage requires a specific design of the valve housing and is expensive to manufacture. Furthermore, the curved bypass passage affords a difficult access. The medium leaving such bypass passage also causes a coniderable and non-muffled noise.

It is, therefore, an object of the present invention to provide a valve of the above mentioned general type which will overcome the drawbacks outlined in the preceding paragraphs.

It is another object of this invention to provide a valve of the above mentioned general character which is light in weight, can easily be checked and can be mounted on a control board.

Still another object of this invention consists in the provision of a valve as set forth in the preceding paragraphs, which can be controlled by a minimum of force.

It is also an object of this invention to provide a valve of the type set forth in the preceding paragraphs, in which the venting passage is easily accessible and which will operate without noise development.

Still another object of the present invention consists in the provision of a valve as set forth above which can be controlled in a very simple manner.

These and other objects and advantages of the invention will appear more clearly from the following specification in connection with the accompanying drawing, in which:

FIG. 1 illustrates a longitudinal section through a valve according to the present invention.

FIG. 2 is a section along the line II—II of FIG. 1.

FIG. 3 illustrates the valve of FIG. 1 as seen in the direction of the arrow A.

A valve according to the present invention which is provided with a valve spindle reciprocable in a bore of a valve housing and sealed in said bore by means of seals while the housing is provided with inlet and outlet means for the flowing medium, is characterized primarily in that the housing is made of synthetic material and composed of individual sections which are non-detachably cemented to each other. As synthetic material for the housing may be employed acrylic-Plexiglas.

The above design and construction result in a very light weight valve thereby permitting its employment where weight is at a premium, as for instance in airplanes. The cementing together of the housing sections in contrast to the heretofore employed screw connections assures a reliable seal so that the valve is safe and reliable in use while at the same time the cost of producing such valve is rather low. For purposes of cementing the parts to each other acrylic glass dissolved in acetone may be used.

Referring now to the drawing in detail, the valve illustrated therein comprises three housing sections 1, 2 and 3 which are arranged in axial alignment with regard to each other and consist of synthetic material, for instance of the material mentioned above. The dividing planes of the valve housing are perpendicular to the valve spindle 4 arranged inside said housing. Preferably, the adjacent housing sections are provided with interconnecting centering surfaces 5, 6. In this way, a very simple, inexpensive and reliable manufacture of the valve housing will be assured.

According to a further feature of the invention, the housing is made of a transparent material, as for instance the material known under the trade mark Plexiglas, so that the interior of the valve will be clearly visible and any disturbances in the operation of the valve can easily be checked and ascertained. The valve spindle 4 may, in accordance with the present invention, likewise be made of synthetic material, preferably of polyvinylchloride. Such a spindle is light in weight and easy to manufacture.

As will be seen from the drawing, the composite valve housing 1, 2, 3 which is generally designated with the reference numeral 10, is provided with fluid connections 7 and 8 which are all located on one side of the housing 10, namely on the side designated with the reference numeral 11. As will also be seen from the drawing, these connections are axis parallel to each other. Valve spindle 4 is axially displaceably arranged in a bore 12 provided in the housing sections 2, 3. Valve spindle 4 is sealed relative to bore 12 by means of O-rings 13 arranged in grooves 14 which latter are wider than the cross-sectional diameter of the respective O-ring 13 therein. When valve spindle 4 is displaced, the O-rings 13 move in a rolling manner in grooves 14 so that the frictional force acting against the displacement of the valve spindle 4 is relatively low.

Advantageously, the width of grooves 14 corresponds to the maximum displacement stroke of valve spindle 4.

According to a further feature of the present invention, the valve is pressure controlled while the control piston is sealed with an O-ring in a wider groove. Of the two housing sections cemented to each other, one housing section, namely section 1, forms the cylinder for the control piston whereas the other two housing sections comprise the valve seats. Advantageously, also the fluid connection for the control cylinder is axis parallel to the other fluid connections.

As will be seen from the drawing, valve spindle 4 has displaceably mounted thereon a valve disc 15 which is movable between abutments 16 and 17. Valve disc 15 is formed by a hard ring covered at both end faces with layers of elastic material, for instance rubber, whereas the said hard ring is preferably made of polyvinylchloride. The said hard ring serves as non-yieldable support for the elastic covers or rubber rings which assure an elastic and safe sealing of the valve seats. More specifically, the said abutments are formed by valve rings 16, 17 which are connected to valve spindle 4 in any convenient manner, as for instance by cementing. The sealing surface of said valve rings is radially spaced from the bore in which the valve spindle 4 is reciprocable.

Valve disc 15 is located in an annular passage 18 of valve housing 10 while the end faces of the annular passage 18 are formed by portions of the housing sections 2 and 3. The valve seats for valve disc 15 are designated by the reference numerals 19 and 20 respectively. The distance of the valve seats 19, 20 from each other equals the distance between the valve rings 16, 17.

As will be seen from the drawing, bore 12 for valve spindle 4 widens around the valve rings 16, 17 so as to form a bore 12a forming together with valve rings 16, 17 annular passages 21, 22. The said annular passages 21, 22 communicate with fluid connections 8 and 9 respectively, while a further fluid connection 7 communicates with annular passage 18 through conduits 7a, 33.

The above arrangement assures a tight and safe closing of the valve seats while only minor manufacturing tolerances are required. Furthermore, the valve seats can form one single piece with the valve housing so that during the assembly of the valve it is merely necessary to introduce the valve spindle 4 into the bore of the valve housing.

As will also be seen from FIG. 1, valve spindle 4 has within the area of valve rings 16, 17 a reduced diameter 4a so that annular chambers 23, 24 are formed which respectively communicate with transverse passages 25, 26 in spindle 4. The said passages 25, 26 communicate with spindle bore 27 representing a venting passage which communicates with the atmosphere in a manner described further below.

In the particular position of the valve as illustrated in FIG. 1, the fluid medium passes from the inlet connection 7 to the outlet connection 9. More specifically, the fluid medium passes from inlet connection 7 into annular passage 18 around valve disc 15. From passage 18, the medium passes between valve disc 15 and the lower valve seat 20 into the lower annular chamber 22 which communicates with the outlet connection 9. From outlet connection 9, the flowing medium is conveyed to a cylinder piston system not shown in the drawing. With the particular embodiment of the valve as shown in the drawing, there is provided a connection 8 (FIG. 2) for the cylinder chamber which in the particular position shown in the drawing is located at that piston side which is not under pressure, said piston chamber being in communication with connection 8. The said cylinder chamber has to be vented through connection 8 when the valve occupies the position shown in the drawing. The fluid medium entering through connection 8 passes into the annular chamber 21 between valve ring 16 and bore 12 of the housing. Inasmuch as valve disc 15 engages the upper valve seat 19, the flowing medium can pass only into the transverse bores 25, 26 and from there through venting passage 27 to the outside.

When the valve occupies its non-illustrated position in which valve disc 15 has its lower end face in engagement with the lower valve seat 20 of valve housing 10, the upper valve ring 21 of valve spindle 4 will be in engagement with the upper end face of valve disc 15. In this instance the fluid medium entering annular chamber 18 through connection 32, control piston 29 and thus valve seat 19 and valve disc 15 into the upper annular chamber 20 and from there to connection 8, whereas the corresponding cylinder chamber of the cylinder piston system connected to the valve is vented through connection 9, the lower annular chamber 22, transverse bores 25, 26 and passage 27.

The valve illustrated in FIGS. 1 to 3 is pressure controlled. To this end the outer housing section 1 forms a control cylinder 28 having reciprocably arranged therein a control piston 29 which is rigidly connected to valve spindle 4. That end face 30 of control piston 29 which faces valve spindle 4 has a smaller effective surface area than the end face 31 facing away from valve spindle 4. That cylinder chamber 28a of control cylinder 28 which faces away from valve spindle 4 communicates with the connection 32 which is axis-parallel to the connections 7, 8 and 9. When control air enters cylinder chamber 28a through connection 32, control piston 29 and thus valve spindle 4 is moved to its other above mentioned but not illustrated end position.

As will also be evident from FIGS. 1 and 2, connection 7 is located on the intermediate housing section 2 and communicates through a plurality of bores 33 located in housing section 2 and extending in axial direction of spindle 4 with annular chamber 18 as well as with that cylinder chamber 28b of control cylinder 28 which faces valve spindle 4. FIG. 1 shows only one of said bores 33. Connection 7 and also the other connections 8, 9 and 32 are preferably inserted and cemented to the respective adjacent valve portions. As will be seen from the drawing, that smaller end face 30 of control piston 29 which faces valve spindle 4 is always subjected to the pressure of the fluid which enters through connection 7. In order to be able to move valve spindle 4 by means of control piston 29 into the above mentioned other end position, the pressure of the fluid medium entering through connection 32 must be of such magnitude that it overcomes the force acting upon the smaller end face 30. As soon as connection 32 is vented, control piston 29 will together with valve spindle 4 be returned to its starting position shown in FIG. 1 by means of the pressure preavailing in cylinder chamber 28b.

As will also be clear from FIGS. 1 and 3, venting passage 27 leads into a muffler 34 which is arranged on that end of valve housing 10 which is opposite to the housing end adjacent control cylinder 28. Muffler 34 which is connected, for instance cemented, to housing 10 greatly muffles the noise caused by the fluid medium leaving the venting passage 27. Muffler 34 comprises a housing 35 which, as mentioned before, is cemented to valve housing section 3 and is provided with discharge openings 36 covered with sound absorbing material, as for instance foam rubber 37, arranged in housing 35.

As also illustrated in FIG. 1, valve disc 15 is formed by three rings 38, 39 and 40 of which the two outer rings 39, 40 are of elastic material, such as rubber, whereas the central ring 38 represents a hard ring which may consist of polyvinylchloride. Ring 38 supports the two outer rubber rings 39, 40 in such a way that they can be sealingly pressed against valve seats 19 and 20. Rings 38, 39 and 40 are in loose and sliding engagement with the reduced diameter portion 4a of valve spindle 4. The connection 7, 8, 9 and 32 have each an outer thread 39a and are inserted into corresponding recesses 38a of valve housing 10 and cemented thereto.

As will be evident from the above, due to the arrangement of all connections 7, 8, 9 and 32 on one side of the valve housing, the valve according to the present invention may together with other valves of the same type be arranged in the form of a switch board so that it can easily be supervised and controlled while at the same time all of said connections are easily accessible.

Due to the fact that housing 10 has a rectangular and preferably square-shaped cross section (see FIG. 2), it can in a space saving manner by simple connecting means together with other valves of this type be arranged in the form of a control board as mentioned above.

It will also be clear from the above that a valve construction according to the present invention can be produced at low cost and makes it possible to produce only multi-way, for instance four-way, valves which by providing corresponding connections can be formed into three-way valves without any major costs in contrast to heretofore known valves of the general type involved. In this way the manufacturing costs of valves are greatly reduced which simultaneously also means a reduction in the stocking of the required valves.

It is, of course, to be understood that the present invention is, by no means, limited to the particular structure shown in the drawing but also comprises any modifications within the scope of the appended claims.

What I claim is:

1. A valve comprising in combination: a housing made of synthetic material and composed of a plurality of sections permanently cemented to each other, said housing being provided with fluid inlet and outlet means and having an axial bore, valve spindle means reciprocable in said bore, and sealing means sealing said spindle means relative to said bore, said housing comprising a first section forming a control cylinder in axial arrangement with said bore, a second section adjacent said first section and in axial alignment therewith and provided with a first valve seat, and a third section adjacent said second section and in axial alignment therewith on the side thereof opposite said first section and provided with a second valve seat; and double-acting fluid pressure operable piston means reciprocable in said control cylinder and operatively connected to said spindle means for reciprocating same; said spindle means being provided with valve means for alternate engagement with said first and second valve seat in conformity with the movement of said piston means in one and the other direction.

2. A valve according to claim 1, in which said spindle means is provided with abutment means spaced from each other in axial direction of said spindle means, and in which said valve member forms a valve disc reciprocable on said spindle means between said abutment means.

3. A valve according to claim 1 in which said second and third housing sections confine annular channel means surrounding a portion of said spindle means in spaced relationship thereto while the oppositely located sides of said channel means respectively form said first and second valve seats, said valve member being disposed between said valve seats and axially movably supported on said spindle means for alternate engagement with said first and second valve seats, and conduit means communicating with said annular channel means and adapted to be connected with fluid conveying means.

4. A valve according to claim 3, in which said valve disc comprises a relatively hard annular member and has its end faces covered by elastic material.

5. A valve according to claim 3, in which said valve disc comprises three superimposed annular members, the central one of said annular members consisting of polyvinylchloride and the other two annular members consisting of rubber material.

6. A valve according to claim 3, which includes two valve rings connected to said spindle means and arranged thereon in spaced relationship to each other for alternate engagement with said valve member, the spacing between said valve rings approximately equalling the spacing between said first and second valve seats.

7. A valve according to claim 1 in which said piston means has a first fluid operable actuating surface facing toward said spindle means for moving the latter in one direction and a second fluid operable actuating surface facing away from said spindle means for moving the latter in the opposite direction, said housing including first and second valve seat means spaced from each other in axial direction of said valve spindle means, said housing confining annular channel means around said valve member and forming said first and second valve seats on opposite sides of said valve member, means for conveying fluid to and from said annular channel means, and conduit means for establishing fluid communication between said annular channel means and said first actuating surface of said piston means.

8. A valve according to claim 7, in which said first and second valve seat means in cooperation with said valve member are operable to control connection of said annular channel means with said inlet and outlet means.

9. A valve according to claim 7, in which said valve spindle means has an axial passage therein communicating with an exhaust, said valve spindle means also being provided with radial passage means communicating with said axial passage for selectively venting said first fluid operable actuating surface.

10. A valve according to claim 7, in which said spindle means is provided with an axial bore communicating with an exhaust and in which said spindle means at opposite sides of said valve member is respectively provided with valve ring means respectively having a free edge axially spaced from said spindle means for alternate engagement with said valve member, each of said valve rings together with the respective adjacent housing wall confining an annular chamber, said first and second valve seat means being adapted to control communication of said annular chambers with said annular channel means, said spindle means also being provided with radial bores communicating with said axial bore of said spindle means, said valve ring means being adapted to control communication between said annular chambers and said radial bore.

11. In a valve; a valve housing having an axial bore with spaced seats therein facing each other, a valve spindle reciprocable axially in said bore, a valve member disposed between said seats and shorter in the axial direction than the axial distance between said seats, said valve member being slidably mounted on said spindle, said spindle having annular valve member engaging regions thereon spaced apart farther than the axial length of said valve member so that axial movement of said spindle will cause a said valve member engaging region thereof to engage said valve member on one side and move it into engagement with the said valve seat on the other side of the valve member, a pressure conduit communicating with said axial bore between said seats, a further conduit communicating with said bore on the side of each said seat opposite the other said seat, an axial hole in the spindle communicating with the surface of the spindle adjacent each said valve member engaging region on the valve member side thereof, and an exhaust passage leading into said housing and communicating with said axial hole, whereby, in each axial position of said spindle said pressure conduit will be in communication with one of said further conduits while the other said further conduit will be in communication with said exhaust passage via said axial hole in said spindle.

References Cited

UNITED STATES PATENTS

| | | | |
|---|---|---|---|
| 2,887,127 | 5/1959 | Broadbent | 251—367 X |
| 3,117,587 | 1/1964 | Willinger | 251—367 X |
| 3,131,716 | 5/1964 | Griswold | 137—242 X |
| 3,185,178 | 5/1965 | Bonnard | 251—367 X |
| 3,199,538 | 8/1965 | Anthon | 251—367 X |
| 3,315,702 | 4/1967 | Passaggio | 251—367 X |

CLARENCE R. GORDON, *Primary Examiner.*

U.S. Cl. X.R.

137—596.12, 608; 251—367